United States Patent
Takahashi et al.

[11] Patent Number: 5,831,373
[45] Date of Patent: Nov. 3, 1998

[54] CATHODE RAY TUBE WITH PLURAL ELECTRON GUN ASSEMBLIES

[75] Inventors: Toru Takahashi, Fukaya, Japan; Eiji Kamohara, Horseheads, N.Y.; Yuji Kuwabara, Fukaya, Japan

[73] Assignee: Kabushiki Kaisha Toshiba, Kawasaki, Japan

[21] Appl. No.: 841,652

[22] Filed: Apr. 30, 1997

[30] Foreign Application Priority Data

Apr. 30, 1996 [JP] Japan .................................... 8-108921

[51] Int. Cl.$^6$ ........................................................ H01J 29/07
[52] U.S. Cl. ............................ 313/2.1; 313/422; 315/9; 315/374
[58] Field of Search ........................... 313/2.1, 422, 496; 315/9, 374

[56] References Cited

U.S. PATENT DOCUMENTS 4,714,856  12/1987  Takenaka et al. .................... 313/2.1
4,777,407  10/1988  Takenaka et al. ...................... 315/9

FOREIGN PATENT DOCUMENTS 8-228320  9/1996  Japan .............................. H01J 29/72

*Primary Examiner*—Sandra L. O'Shea
*Assistant Examiner*—Michael Day
*Attorney, Agent, or Firm*—Pillsbury Madison & Sutro LLP

[57] ABSTRACT

A cathode ray tube includes a vacuum envelope having a face plate (1), a continuous phosphor screen (7) formed on the inner surface of the face plate (1), the phosphor screen (7) including a plurality of scanning regions (R1–R15) disposed in rows and column, and a rear plate facing the phosphor screen (7), a scanning arrangement including a plurality of electron guns (15) attached to the rear plate, for individually emitting electron beams toward the phosphor screen, and deflection yokes (16) coupled to corresponding electron guns (15) for deflecting the electron beams. A control section (30) controls the electron guns (15) and the yokes (16) so that one row of the scanning regions is scanned simultaneously while other rows are suppressed.

2 Claims, 5 Drawing Sheets

CATHODE RAY TUBE WITH PLURAL ELECTRON GUN ASSEMBLIES

BACKGROUND OF THE INVENTION

The present invention relates to a cathode ray tube, and more particularly, to a cathode ray tube in which a plurality of regions of a continuous screen are dividedly scanned.

Described in Jpn. Pat. Appln. KOKAI Publication Nos. 48-90428 and 49-21049, Jpn. UM Appln. KOKAI Publication No. 53-117130, etc. are cathode ray tube apparatuses in which high-resolution images can be displayed on a wide screen. In these apparatuses, the wide screen is composed of a plurality of small-sized independent cathode ray tubes that are arranged in regular order. The cathode ray tube apparatuses of this type can be effectively used with a gigantic outdoor screen that includes a large number of divisions. If these apparatuses are used with a medium-size screen about 40 inches wide, however, the image display regions of the individual cathode ray tubes have conspicuous seams, so that displayed images are defective. In the case where one such apparatus is used in a household TV set or as a terminal graphic display unit for computer-aided design (CAD), in particular, seams appear on the displayed images, resulting in fatal defects.

On the other hand, cathode ray tube apparatuses of another type are described in U.S. Pat. No. 3,071,706, Jpn. UM Appln. KOKOKU Publication No. 39-25641, Jpn. Pat. Appln. KOKOKU Publication No. 42-4928, Jpn. Pat. Appln. KOKAI Publication No. 50-17167, etc. In these apparatuses, the respective phosphor screens (screen units) of a plurality of cathode ray tubes are integrated into one continuous phosphor screen, and this integral screen has a plurality of regions. These regions are dividedly scanned with electron beams emitted from a plurality of electron guns that are disposed individually in the respective necks of a plurality of funnels, whereby images are generated on the regions. These images on the individual regions are joined together, whereupon one synthetic image is displayed on the screen.

These multi-neck cathode ray tube apparatuses having one integral or continuous phosphor screen can eliminate seams in the displayed images, which constitute drawbacks of the aforesaid cathode ray tube apparatuses that include the small-sized independent cathode ray tubes, and therefore, can ensure considerably clear images. In the cathode ray tube apparatuses of this type, however, the regions to be dividedly scanned adjoin one another so closely that slight differences in brightness, contrast, hue, etc. between the regions are conspicuous instead.

Although absolute evaluation of an image is not easy, in general, a plurality of images can be relatively evaluated with high sensitivity. In the case where the images are located close to one another, therefore, they must be completely equalized in brightness, contrast, hue, etc. In the cases of the multi-neck cathode ray tube apparatuses, moreover, it was ascertained that a feeling of disharmony is produced by time lags for the reproduction of the adjacent images despite the perfect coincidence in brightness, contrast, and hue.

While a cathode ray tube generally reproduces an image by deflecting an electron beam emitted from an electron gun in the horizontal and vertical directions by means of a deflector and scanning a phosphor screen horizontally and vertically, its horizontal deflection frequency is much higher than its vertical deflection frequency. In the case of the NTSC system, for example, the horizontal deflection frequency is at 15.75 kHz, while the vertical deflection frequency is as low as 60 Hz. Thus, the horizontal deflection frequency is about 250 times as high as the vertical deflection frequency.

The electron beam emitted from the electron gun is used to scan the phosphor screen in the horizontal direction at this horizontal deflection frequency, whereupon the phosphor radiates. The time of horizontal scanning with the electron beam is substantially as long as the duration of afterglow of the phosphor. Even in the case of a cathode ray tube in which one continuous phosphor screen is horizontally divided into a plurality of regions to be scanned, therefore, images generated individually on the horizontally adjacent regions never give a disharmonious impression.

For images generated on the vertically adjacent regions, however, the vertical scanning time is much longer than the horizontal scanning time and also longer than the duration of afterglow of the phosphor. Therefore, the images generated on the vertically adjacent regions give a disharmonious impression. Thus, in the case where the cathode ray tube that includes the continuous phosphor screen divided into a plurality of regions is used in a conventional TV set, a raster on the phosphor screen looks as if it were divided into sections by the boundaries between the vertically adjacent regions, resulting in fatal defects.

BRIEF SUMMARY OF THE INVENTION

The present invention has been contrived in consideration of these circumstances, and its object is to provide a cathode ray tube in which a plurality of divided regions of one continuous screen are separately scanned with electron beams emitted from a plurality of electron guns, whereby a synthetic image obtained by joining together images generated on the individual regions can be made to be a reproduced image that gives no disharmonious impression.

In order to achieve the above object, a cathode ray tube according to the present invention comprises: a vacuum envelope including a face plate, having one continuous phosphor screen formed on the inner surface thereof, and a rear plate facing the face plate; and scanning means including a plurality of electron guns attached to the rear plate for individually emitting electron beams toward the phosphor screen, and a plurality of deflecting means for deflecting the electron beams, emitted individually from the electron guns, in a first direction and a second direction perpendicular to the first direction, for scanning the phosphor screen with the electron beams in the first direction at a first scanning speed and in the second direction at a second speed lower than the first speed, thereby dividedly scanning a plurality of regions of the phosphor screen arranged at least in the second direction and generating a raster. The scanning means includes control means for controlling the electron guns and the deflecting means so that the raster is generated by subjecting the regions arranged in the second direction to second-direction scanning based on a time series.

According to the cathode ray tube of the invention, moreover, the control means controls the electron guns and the deflecting means in a manner such that first-direction scanning and second-direction scanning of one of the regions arranged in the second direction are started after first-direction scanning and second-direction scanning of another region adjoining the one region in the second direction are finished.

Additional objects advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A color cathode ray tube according to an embodiment of the present invention will now be described in detail with reference to the accompanying drawings.

Figure 1:
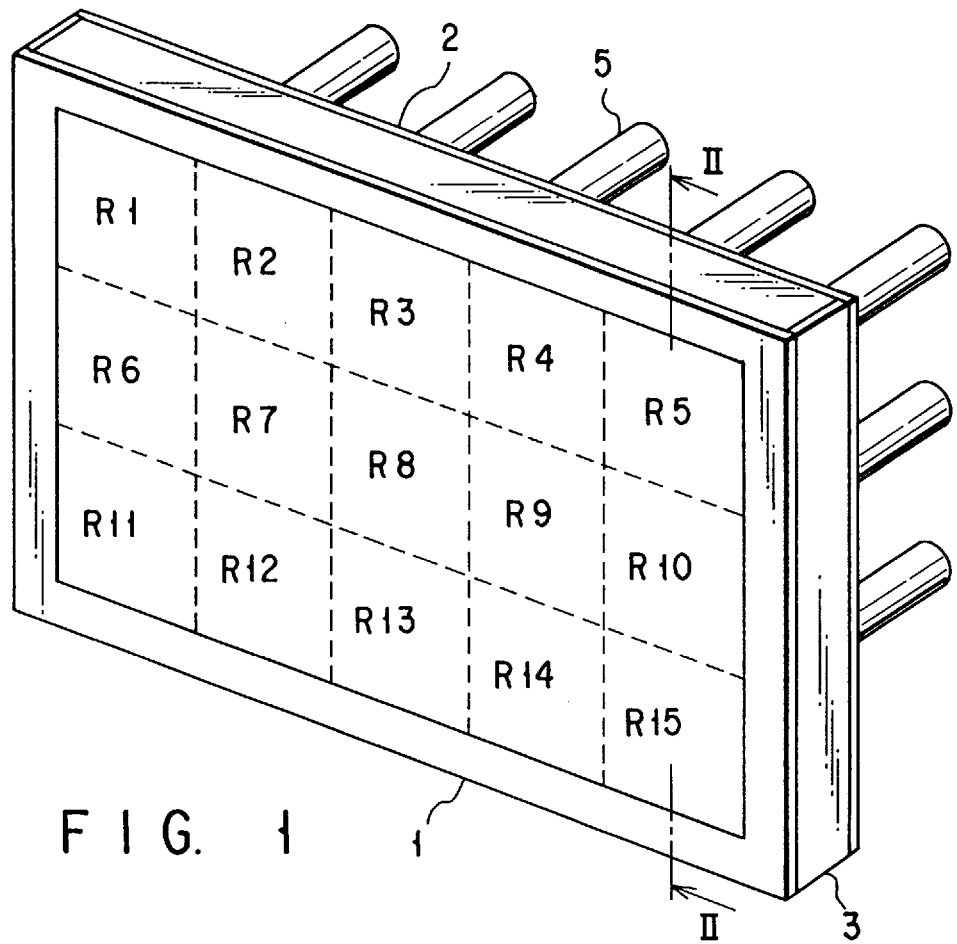
FIG. 1 is a perspective view of a color cathode ray tube according to an embodiment of the present invention.
Figure 2:
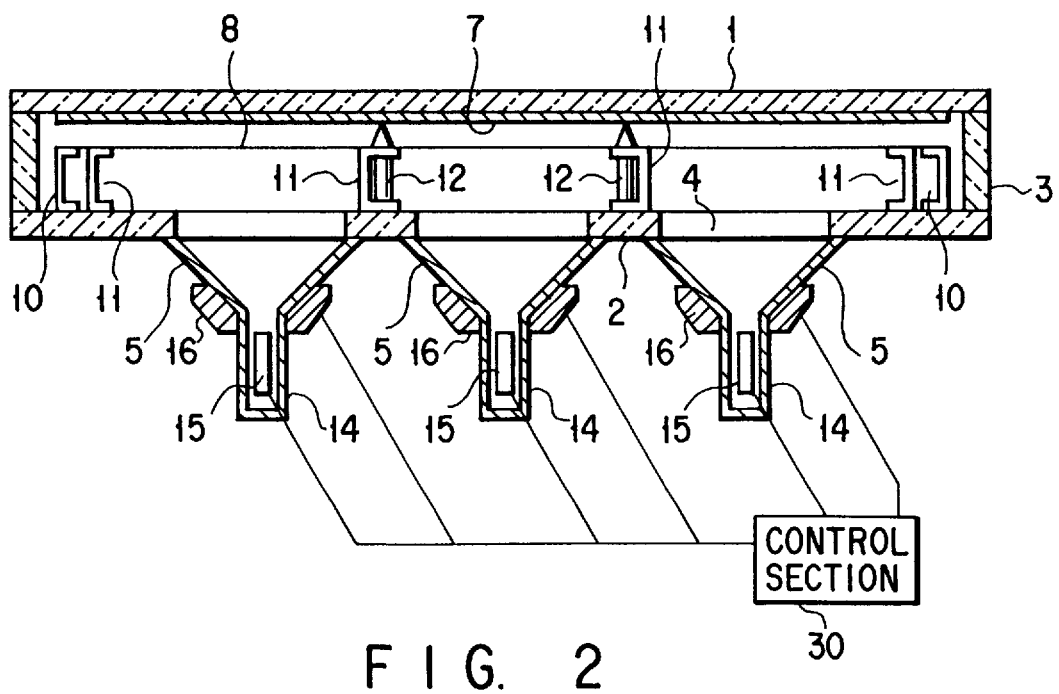
FIG. 2 is a sectional view taken along line II—II of FIG. 1.
Figure 3:
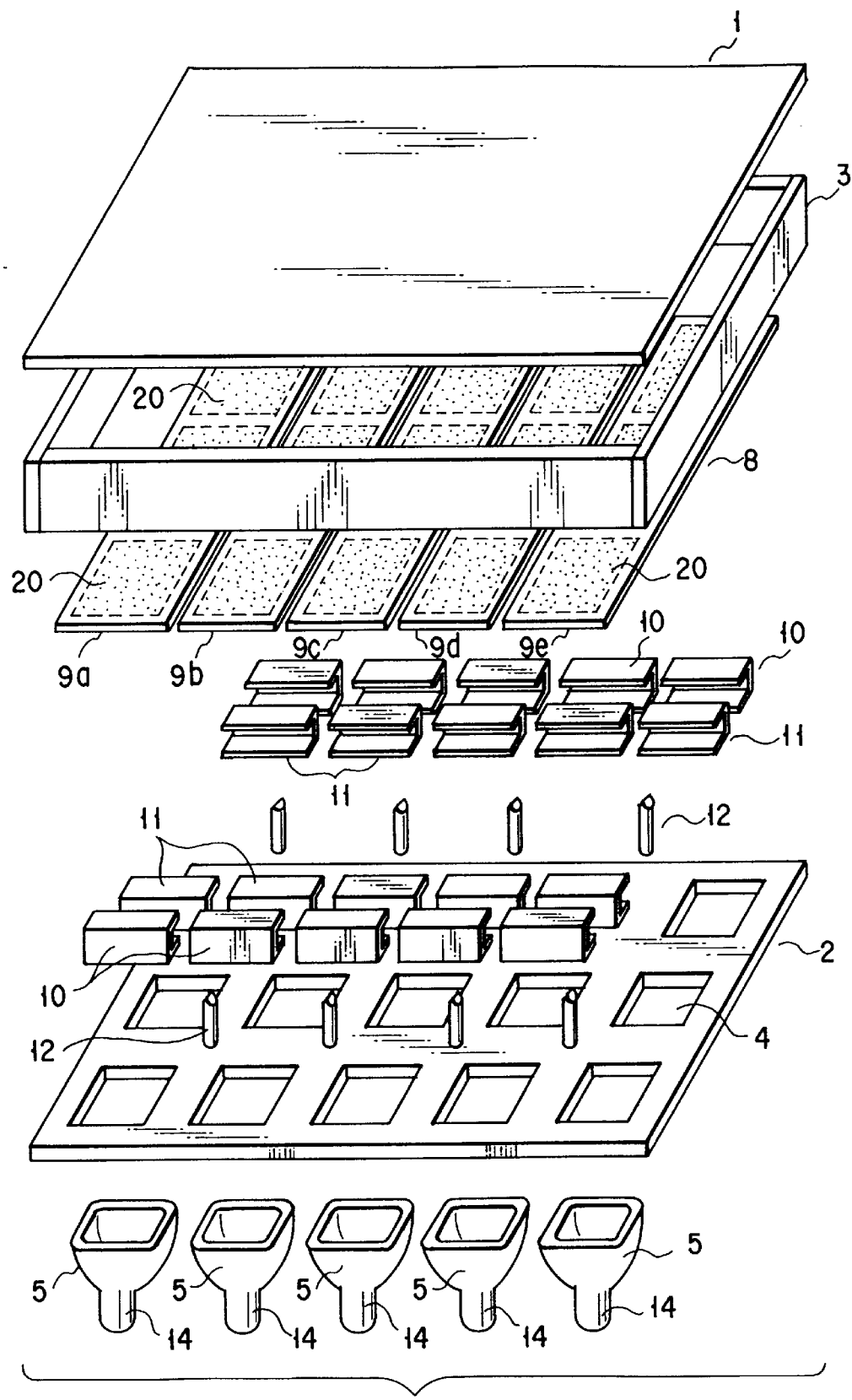
FIG. 3 is an exploded perspective view of the color cathode ray tube.

As shown in FIGS. 1, 2 and 3, the color cathode ray tube comprises a vacuum envelope in the form of a rectangular box. This envelope is provided with a substantially rectangular flat face plate 1 of glass, a substantially rectangular flat rear plate 2 of glass opposed to the face plate 1 in parallel relation, side walls 3 bonded substantially at right angles to the respective peripheral portions of the plates 1 and 2, and a plurality of funnels 5 bonded the rear plate 2 so as to individually cover a plurality of apertures 4 that are formed in the rear plate 1. In this embodiment, the rear plate 2 is formed having 15 apertures 4 in a matrix, five in each row in the horizontal direction (X-axis direction) and three in each column in the vertical direction (Y-axis direction).

A phosphor screen 7 is formed on the inner surface of the face plate 1. The screen 7 includes elongate stripe-shaped phosphor layers, which extend separately in the vertical direction and radiate individually in three colors, blue, green, and red, and elongate black stripes arranged between the phosphor layers and extending in the vertical direction.

In the vacuum envelope, a shadow mask 8 is located opposite the inner surface of the phosphor screen 7. The mask 8 includes a plurality of effective portions 20 that correspond individually to a plurality of regions R1 to R15 of the screen 7, which are scanned dividedly with electron beams, as mentioned later. A large number of electron beam apertures are formed in each effective portion. In order to restrain a purity drift attributable to thermal expansion, the shadow mask 8 is horizontally divided corresponding to the number of divisions of the regions of the phosphor screen 7 in the horizontal direction. In the illustrated example, the mask 8 is divided into five elongate flat shadow mask pieces 9a to 9e, which are arranged side by side at regular intervals in the horizontal direction. Each mask piece extends in the vertical direction, and includes three of the effective portions 20 that are continuously joined together with noneffective portions between them.

The vertically opposite end portions of each of the shadow mask pieces 9a to 9e are supported on the rear plate 2 by means of a pair of first mask anchoring members 10 with a U-shaped cross section, individually. The anchoring members 10 are fixed individually to the vertically opposite end portions of the inner surface of the rear plate 2 by means of fritted glass or the like, whereby each mask piece is supported under vertical tension.

Just inside the first mask anchoring members 10, a pair of second mask anchoring members 11 are also fixed to the rear plate 2 by means of fritted glass, individually. Each second anchoring member 11 is formed having a U-shaped cross section higher than that of each first anchoring member 10. Thus, each shadow mask piece is slightly lifted by the second anchoring members 11, so that it is kept at a predetermined distance from the phosphor screen 7 in parallel relation. As shown in FIG. 2, the second mask anchoring members 11 are also arranged in intermediate portions of each shadow mask piece.

A plurality of plate support members 12 are arranged between the face plate 1 and the rear plate 2. The support members 12 serve to bear atmospheric load that acts on the flat face and rear plates 1 and 2 of the vacuum envelope. Each support member 12 is in the form of a pillar having a wedge-shaped distal end portion. The proximal end portion of each member 12 is fixed to the rear plate 2 by means of fritted glass or the like, and the wedge-shaped distal end portion is in contact with its corresponding black stripe of the phosphor screen 7.

An electron gun 15 for emitting three electron beams is disposed in a neck 14 of each funnel 5. Mounted on the outside of each funnel 5 is a deflection yoke 16, which functions as a deflector for deflecting the electron beams emitted from the electron gun 15 in the horizontal and vertical directions.

The electron guns 15 and the deflection yokes 16 are connected to a control unit 30 for use as control means, and the operation is controlled by this control unit. The guns 15, yokes 16, and unit 30 constitute scanning means that scans the phosphor screen 7 with the electron beams and generates a raster.

The cathode ray tube with the aforementioned construction is manufactured in the following processes.

First, the phosphor screen 7 is formed beforehand on the inner surface of the face plate 1 by photo-lithography. On the other hand, the first and second mask anchoring members 10 and 11 and the plate support members 12 are positioned and fixed by means of fritted glass or the like. Then, the shadow mask pieces 9a to 9e, prepared in advance, are welded under vertical tension to their corresponding pairs of first anchoring members 10 that are fixed to the rear plate 2. Further, the electron guns 15 are sealed in advance in the respective necks 14 of the funnels 5, individually.

Thereafter, the face plate 1 having the phosphor screen 7 formed thereon, the rear plate 2 fitted with the shadow mask 8, plate support members 12, etc., the funnels 5 having the electron guns 15 sealed therein, and the side walls 3 are combined in predetermined relations, and all these elements are bonded integrally by means of fritted glass. The color cathode ray tube is manufactured by exhausting the resulting vacuum envelope.

The color cathode ray tube may be manufactured by any other methods than the aforesaid one. These alternative methods include a method in which the electron guns 15 are sealed in the necks 14 after the funnels 5 are bonded to the rear plate 2, a method in which the side walls 3 are bonded to the face plate 1 or the rear plate 2 in advance, and a method in which the second mask anchoring members 11 are fixed after the shadow mask pieces 9a to 9e are welded to the first mask anchoring members 10 that are fixed to the rear plate 2.

According to the color cathode ray tube constructed in this manner, the three electron beams emitted from the electron gun 15 in the neck 14 of each funnel 5 are converged on the phosphor screen 7, and are deflected in the horizontal direction (first direction) and vertical direction (second direction) by means of a magnetic field that is generated by the deflection yoke 16 on each funnel 5. The phosphor screen 7 is divided into a plurality of regions, 15 regions R1 to R15 in the illustrated example, five in each row in the horizontal direction and three in each column in the vertical direction, by means of the shadow mask 8, and is scanned horizontally and vertically. Images generated individually on the regions R1 to R15 by this split scanning are joined together by controlling signals applied to the electron guns 15 and the deflection yokes 16, whereupon a large synthetic image without any breaks or laps is displayed on the whole surface of the phosphor screen 7.

The following is a detailed description of reproduction of the aforesaid synthetic image by the NTSC method.

Figure 4:
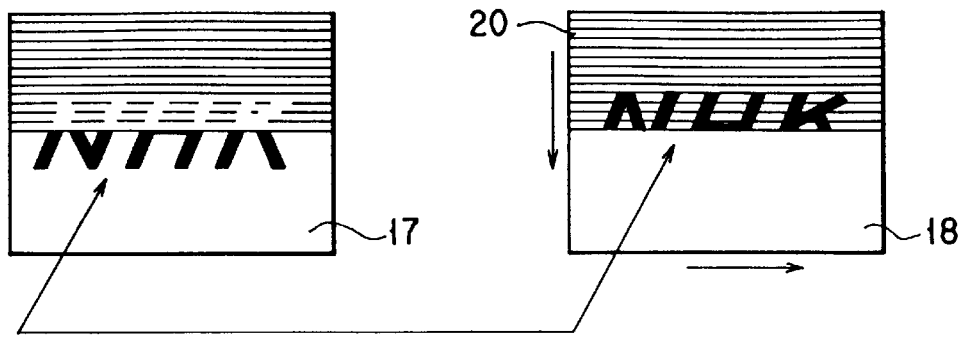
FIG. 4 is a diagram for illustrating the relation between transmitter and receiver sides based on the NTSC raster generating method.
Figure 5:
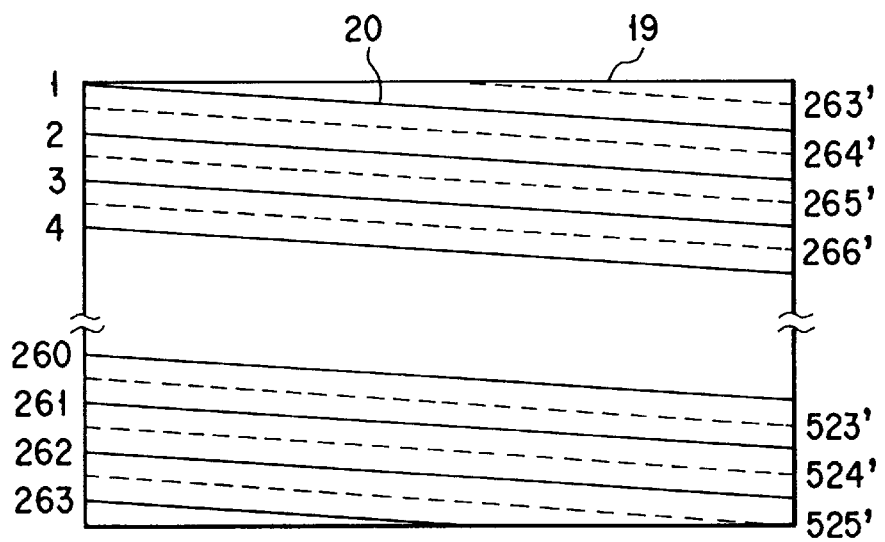
FIG. 5 is a diagram for illustrating the way of scanning a color cathode ray tube based on the NTSC system.

In a conventional cathode ray tube that reproduces an image by scanning a phosphor screen with three electron beams emitted from one electron gun, the gun is prearranged so that the electron beams are converged on one point in the center of a picture. The three electron beams are deflected by means of a magnetic field that is generated by a deflector, and are used to scan the whole picture, whereupon the image is reproduced. In response to signals delivered from a transmitter (camera) side 17, therefore, a receiver side 18 interlaces and draws 525 (=2s0) scanning lines 20 on a screen 19 at a horizontal scanning frequency fH0=15.75 kHz and a vertical scanning frequency fV0=60 Hz according to the NTSC method, as shown in FIGS. 4 and 5.

Actually, all the 525 scanning lines cannot be drawn on the screen on account of the return period and overscanning. For ease of description, however, let it be supposed that all the 525 scanning lines are drawn.

Since the scanning lines are interlaced, in this case, an image reproduced by one cycle of vertical scanning is formed of 262.5 (=s0) scanning lines 20 (field scanning), and the image formation requires tv0=1/60 second.

If the return period is discounted, each scanning line 20 is horizontally scanned in 1/15750 (=1/(60×262.6)) second (line scanning), and 262.5 scanning lines 20 are drawn at regular intervals in the vertical direction in 1/60 second. The field scanning is thus carried out twice in order to nullify the effect of flickering.

In the color cathode ray tube according to the present embodiment, on the other hand, the one continuous phosphor screen 7 is divided into a plurality of regions, e.g., 15 regions R1 to R15, which are dividedly scanned with the three electron beams emitted from the electron guns 15. Preferably, according to this arrangement, the regions R1 to R15 should be scanned simultaneously, as indicated by arrows 22 in FIG. 6, in order to increase the brightness of the whole picture. If the scanning lines are distributed uniformly in the vertical direction of the picture, in this case, the number 2s1 of scanning lines in the regions R1 to R15 is equal to a number obtained by dividing the total number 2s0 of scanning lines in each frame by the number NV of divisions in the vertical direction of the picture, i.e., 2s1= 2s0/NV=525/3=175.

If a vertical scanning frequency fV1 for the regions R1 to R15 is 60 Hz, which is equal to the vertical scanning frequency fV0 delivered from the transmitter side (fV1= fV0=60 Hz), a horizontal scanning frequency fH1 for the regions R1 to R15 is $$\begin{aligned} fH1 &= S1 \times fV0 \\ &= (S0/NV) \times fV0 \\ &= S0 \times fV0/NV = fH0/NV. \end{aligned}$$

Thus, if the vertical scanning frequency fV1 for the regions R1 to R15 is 60 Hz, the horizontal scanning frequency fH1 for the regions R1 to R15 is one part of the number of vertical divisions compared with the basic horizontal scanning frequency fH0 (=15.75 kHz), that is, ⅓ or only 5.25 kHz in the illustrated case.

In order to make the image reproduced on the regions R1 to R15 seamless and continuous, on the other hand, it is necessary only that the regions R1 to R15 be overscanned and physical shielding means be provided lest the overscanned regions appear on the picture, or video signals be cut off when the overscanned portions are scanned with the electron beams. By overscanning the regions R1 to R15 in this manner, the image reproduced thereon can be very easily made seamless and continuous.

Even though the horizontal scanning frequency fH1 for the regions R1 to R15 is at 5.25 kHz, one part of the number of vertical divisions compared with the basic horizontal scanning frequency fH0, as described above, it is still about 90 times as high as the vertical scanning frequency fV1 at 60 Hz. Accordingly, the speed of horizontal scanning with the electron beams is so high that differences in brightness between the horizontally adjacent regions are not conspicuous.

On the other hand, the vertical scanning frequency fV1 is as low as 60 Hz, and the speed of vertical scanning with the electron beams is low. Accordingly, differences in brightness between the vertically adjacent regions create conspicuous seams, which result in fatal defects of the color cathode ray tube of this type.

Figure 6:
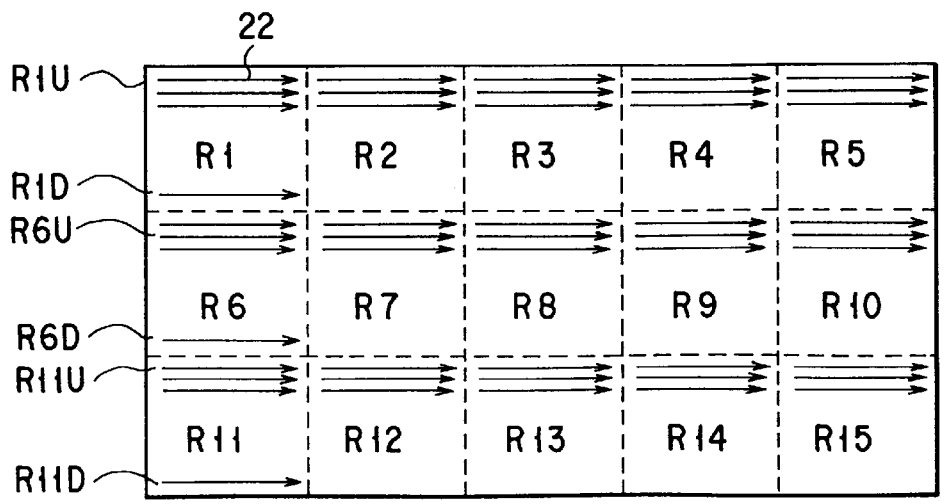
FIG. 6 is a diagram schematically showing a method for starting simultaneous scanning of regions in a plurality of stages.

When a lower end portion R1D of the region R1 is scanned with the electron beams that have started to be used to scan the region R1 from its upper end portion R1U, for example, as shown in FIG. 6, a lower end portion R6D of the region R6 that vertically adjoins the region R1 is also scanned with the electron beams that have started to be used to scan the region R6 from its upper end portion R6U. Moreover, a lower end portion R11D of the region R11 that vertically adjoins the region R6 is scanned with the electron beams that have started to be used to scan the region R11 from its upper end portion R11U. Thus, rasters are generated. If the vertical scanning speed is low, in this case, differences in brightness are caused individually between the lower end of the region R1 and the upper end of the region R6 and between the lower end of the region R6 and the upper end of the region R11, at the seams between the rasters. If you blink your eyes, for example, you can clearly recognize the raster seams between the regions R1, R6 and R11 by the differences in brightness.

Figure 7A:
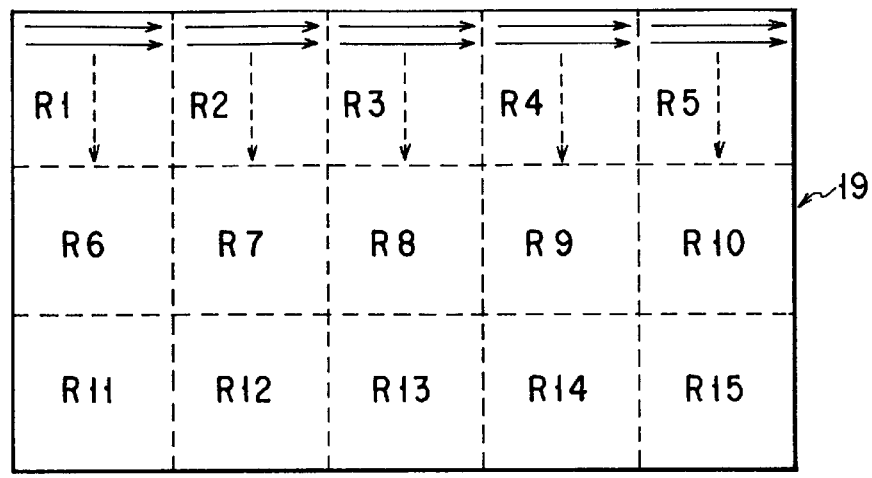
FIGS. 7A, 7B and 7C are diagrams individually showing raster generating processes according to the present embodiment, in which a plurality of vertically arranged regions start to be scanned with predetermined time lags.
Figure 7B:
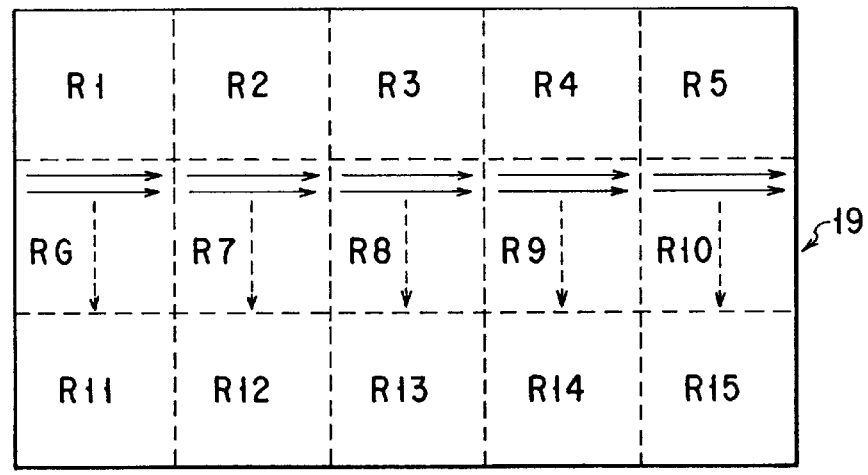
Figure 7C:
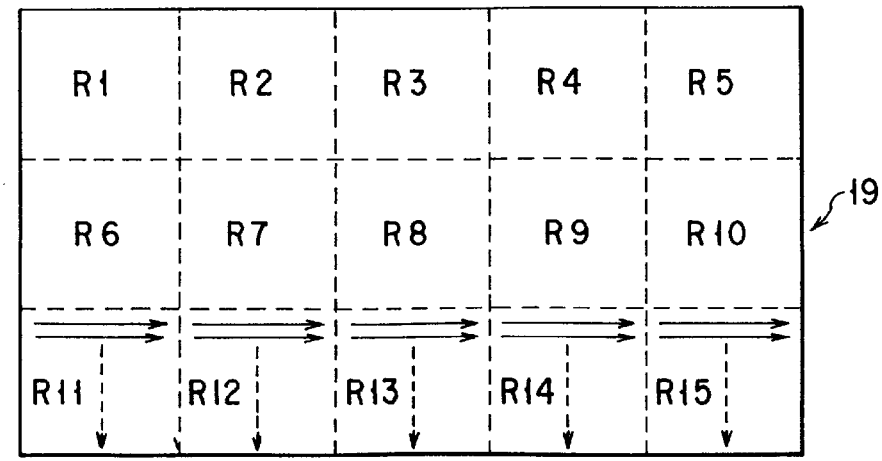

According to the color cathode ray tube of the present embodiment, therefore, the regions R1, R2, R3, R4 and R5 in the first stage or row, among the regions R1 to R15 in three horizontal rows divided vertically, are simultaneously scanned in the horizontal and vertical directions to generate rasters, as shown in FIG. 7A. When these regions R1, R2, R3, R4 and R5 are scanned to their respective lower end portions, the regions R6, R7, R8, R9 and R10 in the second stages simultaneously start to be scanned in the horizontal and vertical directions to generate rasters, as shown in FIG. 7B. When the regions R6, R7, R8, R9 and R10 are scanned to their respective lower end portions, moreover, the regions R11, R12, R13, R14 and R15 in the third stages simultaneously start to be scanned in the horizontal and vertical directions to generate rasters, as shown in FIG. 7C. While the rasters are being generated on the regions R1, R2, R3, R4 and R5 in the first stage, no rasters are generated on the regions R6 to R10 and the regions R11 to R15 in the second and third stages. While the rasters are being generated on the regions R6, R7, R8, R9 and R10 in the second stage, moreover, no rasters are generated on the regions R1 to R5 and the regions R11 to R15 in the first and third stages. While the rasters are being generated on the regions R11, R12, R13, R14 and R15 in the third stage, furthermore, no rasters are generated on the regions R1 to R5 and the regions R6 to R10 in the first and second stages. In this manner, a general raster is generated on the whole picture 19.

There are several methods of raster generation.

If the general raster is expected to be generated in $1/60$ second (=tv0), for example, the raster on each of the regions R1 to R15 is generated in a time equal to one part of the number (NV) of vertical divisions compared with tv0, that is, in $tv1=tv0/NV=(1/60)/3=1/180$ second. Thus, the vertical scanning frequency fV1 for the regions R1 to R15 should only be adjusted to fV1=180 Hz. If this is done, the horizontal scanning frequency fH1 for the regions R1 to R15 is $$\begin{aligned}fH1 &= S1 \times fV1\\ &= S1 \times (NV \times fV0)\\ &= (S0/NV) \times (NV \times fV0)\\ &= S0 \times fV0 = fH0,\end{aligned}$$

so that it should only be adjusted to fH0=15.75 kHz.

Figure 8:
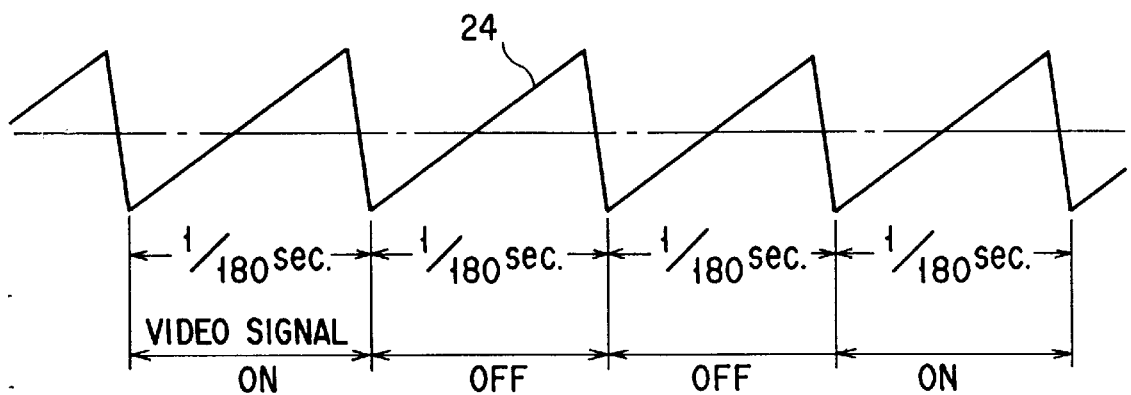
FIG. 8 is a graph showing an example of a vertical deflection current waveform for the color cathode ray tube.

This adjustment or setting will be described with respect to the region R1, for example. As shown in FIG. 8, field-scanning the region R1 is finished by inputting a video signal in first $1/180$ second of the waveform of a vertical deflection current 24, field-scanning the region R6 in the second stage is finished with the electron beams cut off in another $1/180$ second, and field-scanning the region R11 in the third stage is finished with the electron beams cut off in still another next $1/180$ second. Then, a video signal is inputted again for a fourth field, and the region R1 is field-scanned. Thus, frame-scanning the region R1 is finished. Likewise, the next two fields are covered with the electron beams cut off, and field-scanning the regions R6 and R11 in the second and third stages is finished, whereupon frame-scanning the vertically adjacent regions R1, R6 and R11 is finished. Thus, frame-scanning all the regions R1 to R15 is finished.

If the raster on all the regions R1 to R15 is generated $1/60$ second (=tv0), the raster on each of the regions R1 to R15 is generated in a time equal to one part of the number (NV) of vertical divisions compared with tv0, that is, in $tv1=1/180$ second. In another method of raster generation, the vertical scanning frequency is then kept at 60 Hz.

Figure 9:
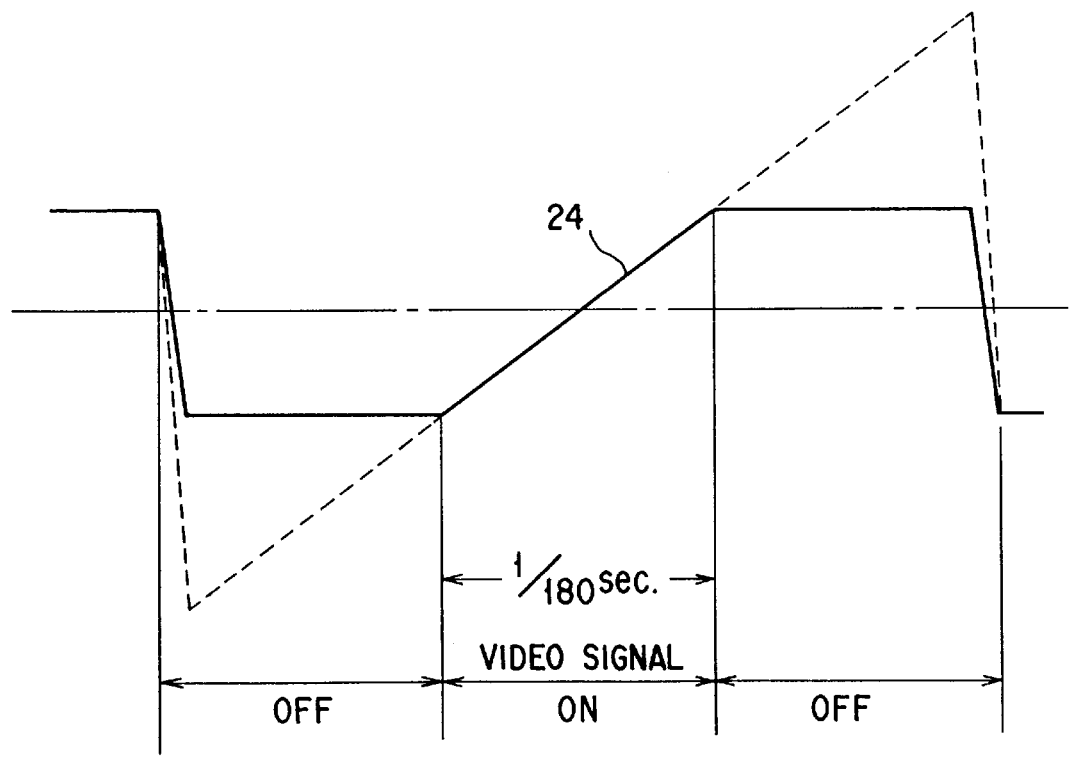
FIG. 9 is a graph showing another example of the vertical deflection current waveform for the color cathode ray tube.

According to this method, the vertical scanning frequency for the regions R1 to R15 is 60 Hz. As shown in FIG. 9, the video signal is inputted for $1/180$ second, and the remaining $2/180$-second sections indicated by broken lines are cutoff sections. Although each vertical deflection current 24 may be provided originally as a widely serrated signal, therefore, it may be made serrated only while the video signal is inputted, according to this method. One raster is obtained by generating the rasters on the vertically adjacent regions in the first, second, and third stages with a phase shift between each two adjacent regions. In this case, the vertical scanning frequency fV1 is equal to fV0 or at 60 Hz, so that the horizontal scanning frequency fH1 is given by $$\begin{aligned}fH1 &= S1 \times fV1\\ &= (S0/NV) \times fV0\\ &= S0 \times fV0/NV\\ &= fH0 \times NV,\end{aligned}$$

and is at 5.25 kHz.

Thus, the general raster is generated on the whole picture by vertically scanning the regions R1 to R15 in the three stages in regular order based on a time series for each stage without simultaneously generating the rasters on the individual regions. Thereupon, the same effect can be produced as in the case of the conventional cathode ray tube in which the raster is generated on the whole picture by means of an electron beam emitted from one electron gun. At the boundaries between the vertically adjacent regions, the scanning lines extend continuously from the lower end portion R1D of the region R1 in the first stage to the upper end portion R6U of the region R6 in the second stage and from the lower end portion R6D of the region R6 in the second stage to the upper end portion R11U of the region R11 in the third stage, for example. Since the vertical scanning speed used in this method of raster generation is three times as high as that for the conventional method, moreover, this method is preferred also in view of the afterglow properties of phosphors, and differences in brightness at the boundaries between the vertically adjacent regions can be removed.

According to the present invention, as described in detail herein, there may be provided a cathode ray tube, which comprises one continuous phosphor screen, a plurality of electron guns, and a plurality of deflectors for deflecting electron beams emitted from the electron guns, and in which the electron beams emitted from the electron guns are deflected in the vertical and horizontal directions by means of the deflectors, and the phosphor screen is divided and scanned vertically at a speed lower than the speed of horizontal scanning. In this cathode ray tube, the raster is generated by vertically scanning the vertically divided regions on a time-series basis, so that the picture can be cleared of a disharmonious impression, which may otherwise be caused by the differences in brightness at the boundaries between the vertically adjacent regions that are scanned at the lower speed. Further, brightness equal to or higher than that of the conventional cathode ray tube can be secured by simultaneously generating the rasters on the horizontally divided regions. Thus, there may be provided a highly practicable cathode ray tube that has a short depth and can enjoy enhanced brightness and high resolution.

It is to be understood that the present invention is not limited to the embodiment described above, and that various changes and modifications may be effected therein by one skilled in the art without departing from the scope or spirit of the invention. According to the foregoing embodiment, for example, the continuous phosphor screen formed on the inner surface of the face plate is divided into 15 regions, five in each row in the horizontal direction and three in each column in the vertical direction. However, the number of the divided regions is not limited to this figure, and the numbers of the horizontal and vertical divisions may be suitably changed depending on the size of the whole phosphor screen and that of each region. Further, the divided regions need not always be of the same size.

In the cathode ray tube according to the foregoing embodiment, moreover, the face plate and the rear plate of the envelope are flat, and support means for bearing atmospheric load acting on the face and rear plates is provided between these plates. However, the present invention may be also applied to a color cathode ray tube of which the face plate has a curved surface or that requires no support means for bearing atmospheric load.

According to the foregoing embodiment, furthermore, the first and second mask anchoring members with a U-shaped cross section are fixed to the rear plate, and the shadow mask is fixed to these anchoring members. These mask anchoring means may, however, be of any other structure, and may be fixed to any other member than the rear plate, e.g., the side walls or face plate.

Although the electron beams emitted from the electron guns are separately deflected by means of the magnetic field that is generated by the deflection yoke, according to the embodiment described above, they may be deflected electrostatically. Further, the cathode ray tube according to the invention may be applied to the PAL, SECAM, HD, and HS-MAC systems or double-speed signal transmission, as well as to the NTSC system. According to these systems or methods, as in the case of the NTSC method described in connection with the foregoing embodiment, horizontal and vertical deflection frequencies are different from each other. In any of these cases, the vertical deflection frequency is higher than the horizontal deflection frequency, and flickering of the picture is caused by this higher vertical deflection frequency. Accordingly, the same effect of the foregoing embodiment can be obtained if the present invention is applied to cathode ray tubes based on these systems.

In the color cathode ray tube described in connection with the foregoing embodiment, furthermore, the shadow mask is located facing the phosphor screen that is formed on the inner surface of the face plate, and a plurality of divided regions of the phosphor screen are scanned with three electron beams emitted from each of a plurality of electron guns. However, the present invention is not limited to the color cathode ray tube arranged in this manner, and may be applied, for example, to a cathode ray tube designed so that one electron beam emitted from an electron gun is finely deflected to display a color image, an index-type color cathode ray tube, or a monochromatic cathode ray tube that displays monochromatic images.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A cathode ray tube comprising:
   a vacuum envelope including;
      a face plate;
      a continuous phosphor screen formed on an inner surface of the face plate, the phosphor screen having at least one column and a plurality of rows of scanning regions; and
      a rear plate facing the phosphor screen; and
   a scanning arrangement including;
      a plurality of electron guns attached to the rear plate for individually emitting electron beams toward the phosphor screen;
      a plurality of deflecting means operatively coupled to the corresponding electron guns for deflecting the electron beams; and
      control means for controlling the electron guns and the deflecting means so that one row of the scanning regions is scanned at a time while scanning of other rows is suppressed.

2. A cathode ray tube comprising:
   a vacuum envelope including;
      a face plate;
      a continuous phosphor screen formed on the inner surface of the face plate, the phosphor screen including a plurality of scanning regions disposed in a plurality of rows and columns; and
      a rear plate facing the the phosphor screen; and
   a scanning arrangement including;
      a plurality of electron guns attached to the rear plate, for individually emitting electron beams toward the phosphor screen;
      a plurality of deflecting means operatively coupled to the corresponding electron guns for deflecting the electron beams; and
      control means for controlling the electron guns and the deflecting means so that one row of the scanning regions is scanned simultaneously while scanning of other rows is suppressed.

* * * * *